(12) United States Patent
Palesano et al.

(10) Patent No.: US 8,474,903 B2
(45) Date of Patent: Jul. 2, 2013

(54) SERPENTINE SECTION STABILIZER FOR VEHICLE PILLAR

(75) Inventors: Timothy J. Palesano, Marysville, OH (US); Joseph M. Riggsby, Marysville, OH (US); W. Sanjaya A. Fonseka, Dublin, OH (US); Robert G. ZumMallen, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 13/097,739

(22) Filed: Apr. 29, 2011

(65) Prior Publication Data

US 2012/0274098 A1  Nov. 1, 2012

(51) Int. Cl.
   *B62D 25/04* (2006.01)
(52) U.S. Cl.
   USPC .................................................. 296/193.06
(58) Field of Classification Search
   USPC ............. 296/203.03, 193.06, 187.12, 187.02, 296/193.01, 209
   See application file for complete search history.

(56) References Cited

U.S. PATENT DOCUMENTS

| | | | |
|---|---|---|---|
| 3,779,595 A * | 12/1973 | Suzuki et al. | ............ 296/187.05 |
| 4,848,835 A | 7/1989 | DeRees | |
| 5,246,264 A | 9/1993 | Yoshii | |
| 5,536,060 A | 7/1996 | Rashid et al. | |
| 6,328,376 B2 | 12/2001 | Son | |
| 6,478,367 B2 | 11/2002 | Ishikawa | |
| 6,488,312 B2 * | 12/2002 | Knoethig et al. | ............. 280/751 |
| 6,607,239 B1 | 8/2003 | Fuji | |
| 6,705,668 B1 * | 3/2004 | Makita et al. | ............ 296/187.03 |
| 7,118,170 B2 * | 10/2006 | Montanvert et al. | .......... 296/209 |
| 7,445,269 B2 | 11/2008 | Yustick et al. | |
| 7,635,157 B2 * | 12/2009 | Wang et al. | ............. 296/193.11 |
| 7,735,906 B2 * | 6/2010 | Takahashi et al. | ....... 296/193.06 |
| 7,798,560 B2 | 9/2010 | Hedderly | |
| 2004/0217623 A1 | 11/2004 | Chernoff et al. | |
| 2006/0005503 A1 | 1/2006 | Bladow et al. | |
| 2010/0133877 A1 | 6/2010 | Mori | |

OTHER PUBLICATIONS

Notification of Transmittal of the International Search Report and Written Opinion, International Search Report, and Written Opinion, PCT/US2012/034396, dated Jun. 28, 2012, ten pages.

* cited by examiner

*Primary Examiner* — Glenn Dayoan
*Assistant Examiner* — Pinel Romain
(74) *Attorney, Agent, or Firm* — Rankin, Hill & Clark LLP (57) ABSTRACT

A vehicle body structure includes a vehicle roof member, a first panel, a second panel, and a serpentine-shaped reinforcement structure. The first panel connects with and depends downwardly from the vehicle roof member. The second panel connects with the first panel. The first panel and the second panel form, when connected, a vehicle pillar. The serpentine-shaped reinforcement structure includes a plurality of peak sections and a plurality of valley sections and is disposed in the vehicle pillar between the first panel and the second panel. The reinforcement structure is fixed to the first panel via a weld at a peak section. The reinforcement structure is closest to the second panel at a valley section. A method for manufacturing a vehicle body structure is also disclosed.

19 Claims, 5 Drawing Sheets

SERPENTINE SECTION STABILIZER FOR VEHICLE PILLAR

BACKGROUND

It is desirable for a motor vehicle body to withstand loads on a vehicle roof for occupant safety and protection. Moreover, it is desirable that the vehicle body be able to withstand a load, expressed as a percentage of vehicle weight, to simulate loads on the vehicle encountered during a vehicle rollover event. When vehicle frame components are loaded through the vehicle roof, vehicle body pillars, which are connected to the vehicle roof, can collapse under the weight of the vehicle. Conventional vehicle pillars include an outer panel connected with an inner panel. The vehicle pillar connects with and depends vertically downwardly from the vehicle roof, typically between two window openings.

A conventional approach for increasing the load carrying capacity of the vehicle pillar is to provide a pillar reinforcement structure between the inner panel and the outer panel. To accommodate for the vehicle weight during a rollover event, these pillar reinforcement structures can be made from very large thickness steel or many layers of smaller thickness metal sheets that are positioned between the inner panel and the outer panel. The aforementioned reinforcing structures can add significantly to the weight of the vehicle, which is undesirable. Moreover, attaching the pillar reinforcement structures to the panels that make up the vehicle pillars can be complicated when following known assembly processes used when assembling a vehicle body structure.

SUMMARY

An example of a vehicle body structure that can overcome at least one of the aforementioned shortcomings includes a vehicle roof member, a first panel, a second panel, and a serpentine-shaped reinforcement structure. The first panel connects with and depends downwardly from the vehicle roof member. The second panel connects with the first panel. The first panel and the second panel form, when connected, a vehicle pillar. The serpentine-shaped reinforcement structure includes a plurality of peak sections and a plurality of valley sections and is disposed in the vehicle pillar between the first panel and the second panel. The reinforcement structure is fixed to the first panel via a weld at a peak section. The reinforcement structure is closest to the second panel at a valley section.

A method for manufacturing a vehicle body structure that can overcome at least one of the aforementioned shortcomings includes positioning a first surface of a serpentine-shaped reinforcement structure in contact with a first panel of a vehicle pillar, welding the reinforcement structure to the first panel, and connecting a second panel to the first panel in a manner that the reinforcement structure is interposed between the first panel and the second panel and a second surface of the reinforcement structure faces toward the second panel. The vehicle pillar connects with a vehicle roof member. The second surface of the reinforcement structure is on an opposite side of the reinforcement structure as the first surface.

Another more detailed example of a vehicle body structure that can overcome at least one of the aforementioned shortcomings includes a vehicle roof member, an outer panel, an inner panel, a serpentine-shaped reinforcement structure, and a plurality of welds. The outer panel connects with and depends downwardly from the vehicle roof member. The outer panel includes an inner surface and an outer surface. The inner panel connects with the outer panel. The outer panel and the inner panel, when connected, form a vehicle pillar depending downwardly from the roof member. The inner panel includes an inward-facing surface and an outward-facing surface. The serpentine-shaped reinforcement structure includes a plurality of peak sections and a plurality of valley sections. The reinforcement structure is disposed in the vehicle pillar between the inner panel and the outer panel. The reinforcement structure includes a first surface contacting the inner surface of the outer panel and a second surface, which is opposite the first surface, facing towards the outward-facing surface of the inner panel. Each weld affixes the reinforcement structure to the outer panel at each peak section. The outer panel of the vehicle pillar is configured such that a generally vertical load applied to the vehicle roof member great enough to deform the outer panel stretches the outer panel in tension. The inner panel of the vehicle pillar is configured such that the generally vertical load applied to the vehicle roof member deforms the inner panel in compression pressing the inner panel toward the outer panel. The reinforcement structure is positioned with respect to the inner panel such that the reinforcement structure inhibits further movement of the inner panel toward the outer panel while the generally vertical load is applied to the vehicle roof member.

DETAILED DESCRIPTION

The description and drawings herein are merely illustrative and various modifications and changes can be made in the structures disclosed without departing from the scope of the appended claims. Identified components of a vehicle body structure described below are merely terms of art that may vary from one vehicle manufacturer to another and should not be deemed to limit the present disclosure or the appended claims.

Figure 1:
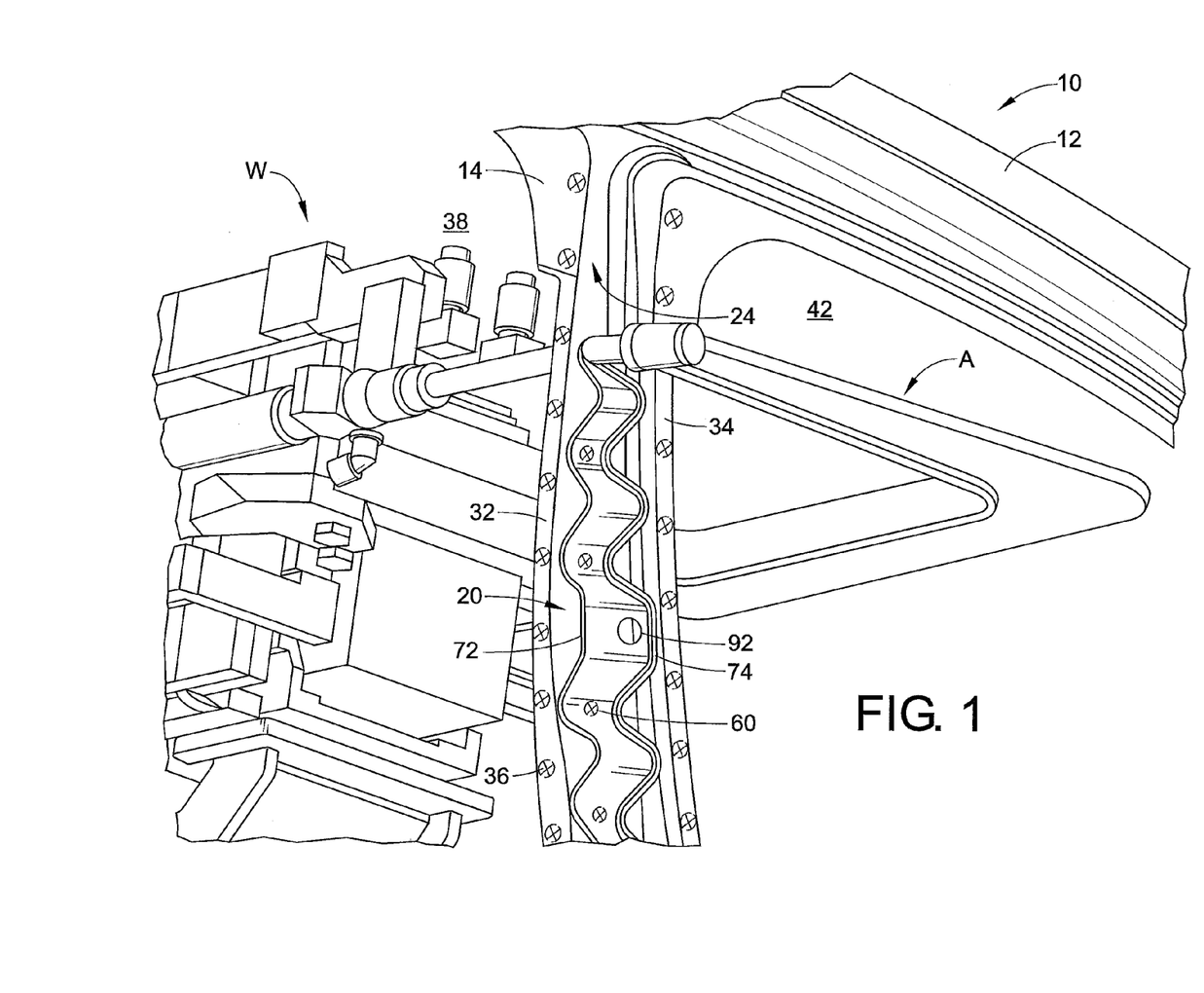
FIG. 1 is a perspective view of a portion of a vehicle body structure including a vehicle roof member, an outer panel of a vehicle pillar and a serpentine-shaped reinforcement structure being welded to the outer panel.
Figure 2:
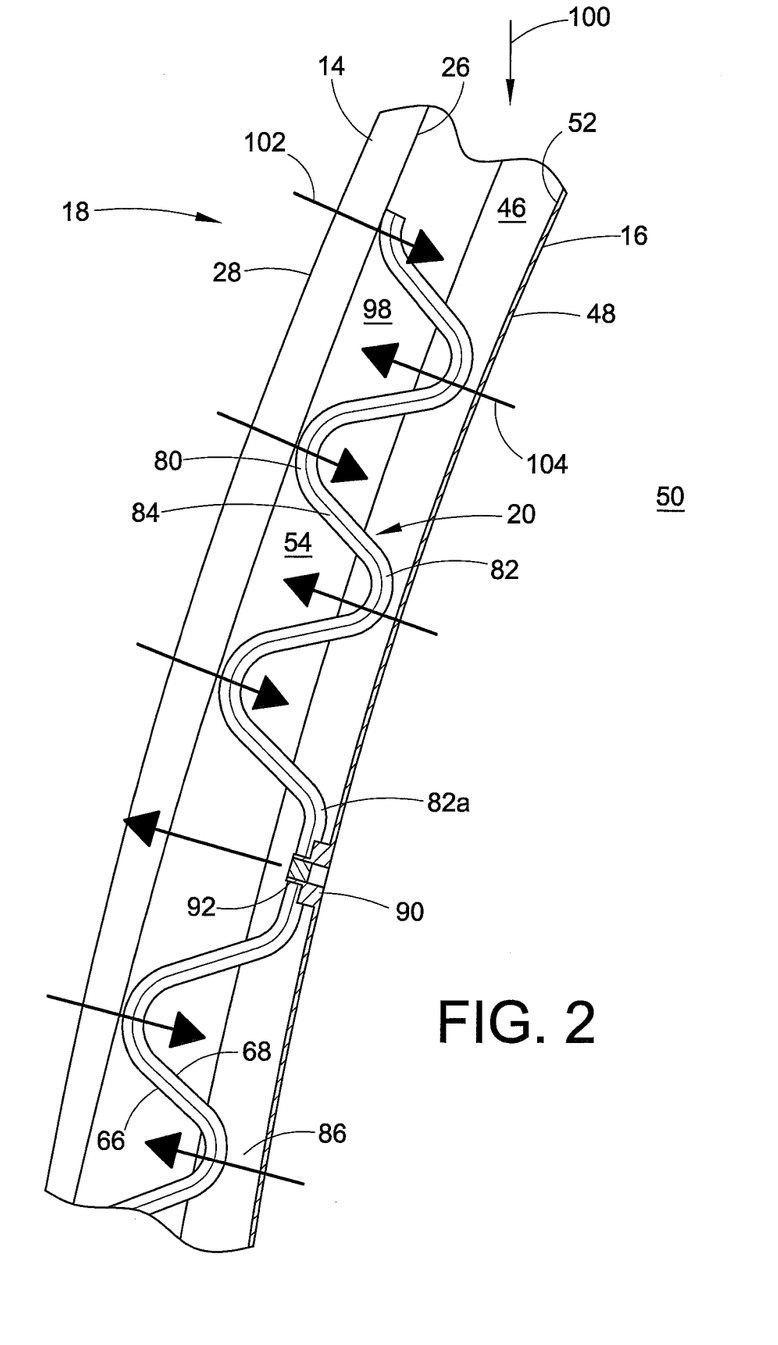
FIG. 2 is a cross-sectional view of the vehicle pillar taken in a plane that is generally normal to a longest axis of a vehicle having the vehicle body structure.

Referring now to the drawings, where like numerals refer to like parts throughout the several views, FIG. 1 illustrates a vehicle body structure 10 including a vehicle roof member 12 and an outer (first) panel 14 connected with and depending downwardly from the vehicle roof member. FIG. 2 depicts an inner (second) panel 16 connected with the outer panel 14. The outer panel 14 and the inner panel 16 form, when connected, a vehicle pillar 18. A serpentine-shaped reinforcement structure 20 is disposed in the vehicle pillar 18 between the outer panel 14 and the inner panel 16. FIGS. 1 and 2 depict only one vehicle pillar 18 of a motor vehicle. A motor vehicle would include at least one other vehicle pillar located on an opposite side of the vehicle as that shown in FIG. 1 and may include other vehicle pillars located on the vehicle body. The reinforcement structure 20 is configured to act as a stiffener that is designed such that the load from a roof of the vehicle can be shared by both the inner panel 16 and the outer panel 14 that make up the pillar 18 while inhibiting the inner and outer panels from flattening or kinking during a vehicle rollover event. As such, the assembly of the vehicle pillar 18 including the reinforcement structure 20 is configured such that the pillars on the vehicle are able to sustain vertical forces applied on each of the pillars during a vehicle rollover event without significant crushing.

With reference back to FIG. 1, the vehicle roof member 12 can be a roof side rail and/or a roof panel similar to known vehicle roof members. The outer panel 14, which can be made from metal and similarly shaped to known outer panels, connects with the vehicle roof member 12 and depends downwardly in a general vertical direction from the vehicle roof member. The illustrated outer panel 14 is generally U-shaped in a horizontal cross section taken generally parallel with a longest dimension of the vehicle to define a channel 24. With reference to FIG. 2, the outer panel 14 includes an inner surface 26 and an outer surface 28. The outer surface 28 of the outer panel 14 can coincide with an external surface of the vehicle. With reference back to FIG. 1, the outer panel 14 is formed to include a forward flange 32 and a rearward flange 34, which act as connection locations for attaching the inner panel 16 to the outer panel 14. Weld locations 36 are schematically depicted in FIG. 1 where the inner panel 16 can be welded to the outer panel 14 to form the vehicle pillar 18. Similar to conventional vehicle pillars, the illustrated vehicle pillar 18 is disposed between two window openings: a forward window opening 38 and a rearward window opening 42 of the vehicle body.

The inner panel 16, which can be made from metal and similarly shaped to known inner panels, connects with the outer panel 14 and depends downwardly in a general vertical direction from the vehicle roof member 12. The inner panel 16 is also generally U-shaped in a horizontal cross-section taken parallel with the longest dimension of the vehicle to define a channel 46. With reference to FIG. 2, the inner panel 16 also includes an inward-facing surface 48 with respect to a vehicle cabin 50 and an outward-facing surface 52 with respect to the vehicle cabin. The inner panel 16 also includes forward and rearward flanges (not shown), which are similarly shaped to the forward and rearward flanges 32, 34, respectively, of the outer panel 14. The respective flanges of the inner panel 16 are welded to the respective flanges 32, 34 of the outer panel 14 to connect the inner panel 16 to the outer panel 14. With the inner panel 16 connected to the outer panel 14, a closed space 54 is defined between the outer panel 14 and the inner panel 16, and the inner panel 16 and the outer panel 14 form the vehicle pillar 18.

Figure 4:
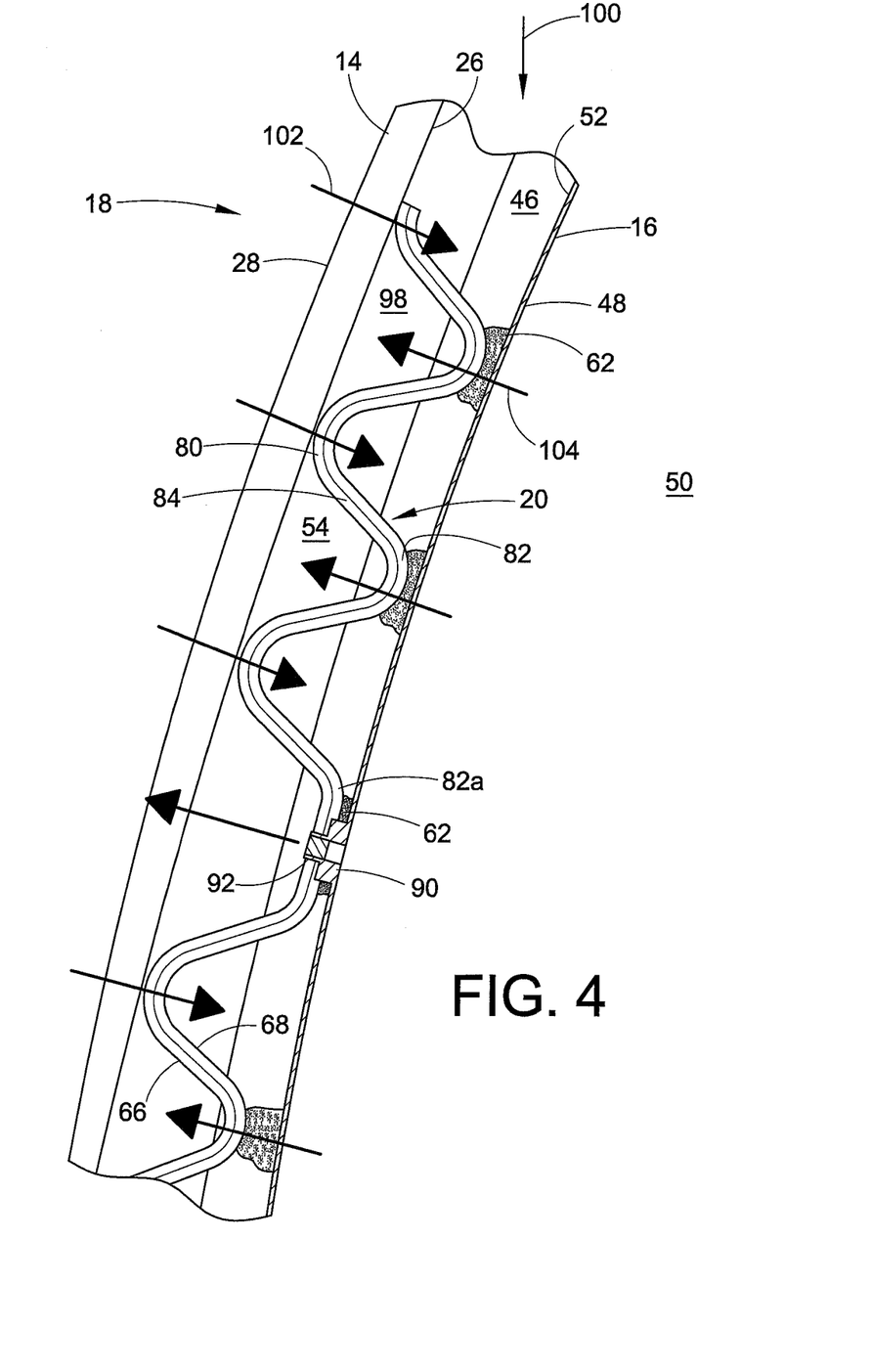
FIG. 4 is a cross-sectional view of the vehicle pillar similar to FIG. 2 depicting the vehicle body structure after heating or baking the vehicle body structure.
Figure 5:
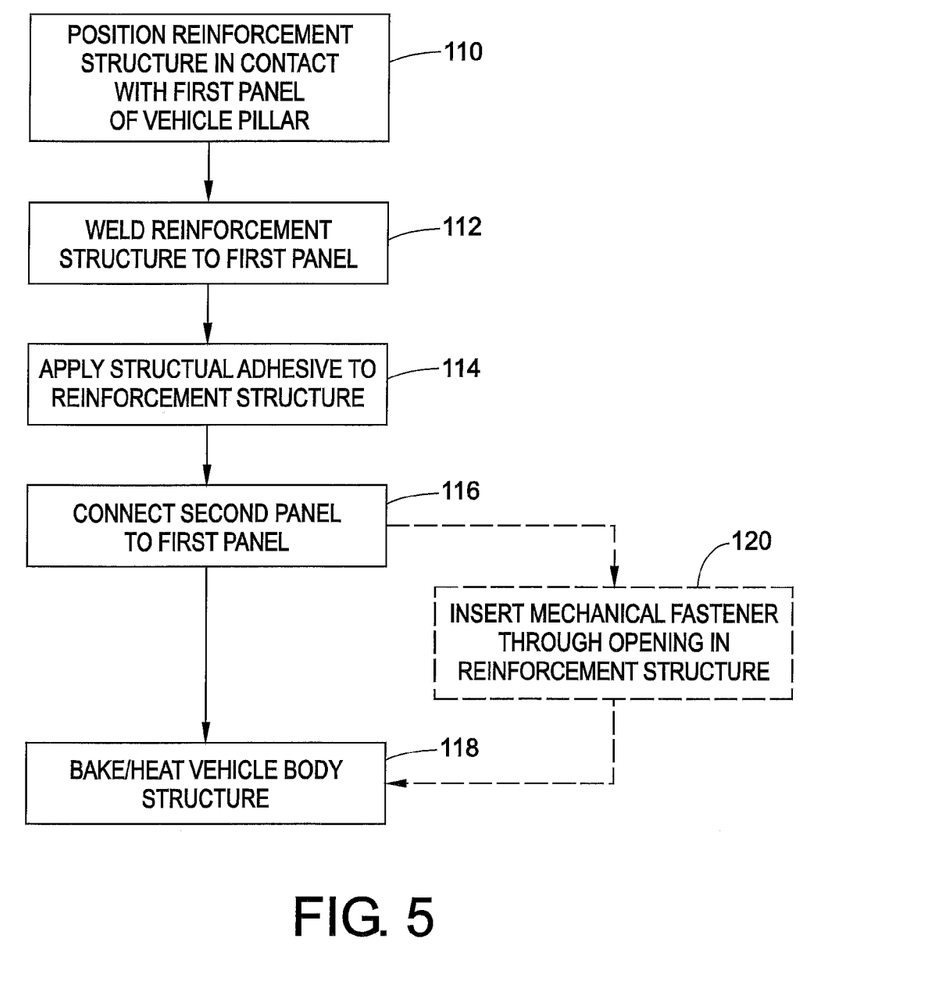
FIG. 5 is a flow chart depicting a method for manufacturing the vehicle body structure.

The serpentine-shaped reinforcement structure 20 is disposed in the vehicle pillar 18, and more specifically in the closed space 54, between the outer panel 14 and the inner panel 16. In the illustrated embodiment, the reinforcement structure 20 is fixed to the outer panel 14 via a weld 60 (depicted schematically—see FIG. 1). As depicted in FIGS. 4 and 5, the reinforcement structure 20 can be fixed to the inner panel 16 via a structural adhesive 62. In the illustrated embodiment, the reinforcement section 20 is a corrugated metal sheet having a substantially constant thickness measured throughout the sheet between a first surface 66 and a second, opposite, surface 68. The thickness of the reinforcement structure 20 can be greater than the thickness of the inner panel 16 and the thickness of the outer panel 14. As seen in FIG. 1, the reinforcement structure 20 could also include rolled longitudinal ledges 72, 74 that extend along the length of the reinforcement structure. The reinforcement structure 20 has a width (measured generally parallel to a longitudinal direction of the vehicle) that is smaller than the width of the channel 24 of the outer panel 14 and the width of the channel 46 formed by the inner panel 16.

The serpentine-shaped reinforcement structure 20 includes a plurality of peak sections 80 and a plurality of valley sections 82. The reinforcement section 20 also includes a plurality of connecting sections 84. Each connecting section 84 is a generally planar section of the reinforcement structure spanning between a respective peak section 80 and an adjacent valley section 82. The reinforcement structure 20 is depicted with the peak sections 80 being curved and having no linear or planar surfaces, similar to a sinusoidal wave. However, both the peak sections 80 and the valley sections 82 can be similarly shaped to a flattened valley section 82a, which is generally planar and is depicted in FIG. 2.

As mentioned above, the reinforcement structure 20 includes a first surface 66 and a second surface 68, which is opposite the first surface. The first surface 66 contacts the outer panel 14 and the second surface 68 faces and can be spaced from the inner panel 16. More specifically, the first surface 66 of the reinforcement structure 20 contacts the inner surface 26 of the outer panel 14 and the second surface 68 faces toward the outer-facing surface 52 of the inner panel 16. As illustrated, the first surface 66 of the reinforcement structure 20 contacts the outer panel 14 at each peak section 80, which allows the reinforcement section to be welded to the outer panel. The second surface 68 of the reinforcement structure 20 is closest to the inner panel 16 at each valley section 82 and defines a gap 86 between valley section 82 of the reinforcement structure 20 and the inner panel 16. In the illustrated embodiment, the reinforcement section 20 includes at least three peak sections 80 and at least three valley sections 82; however, a fewer or greater number of each can be provided. In the illustrative embodiment, the reinforcement section 20 is welded to the outer panel 14 at each of the at least three peak sections 80 and the reinforcement section can be fixed to the inner panel 16 via the structural adhesive 62 at each of the at least three valley sections.

Figure 3:
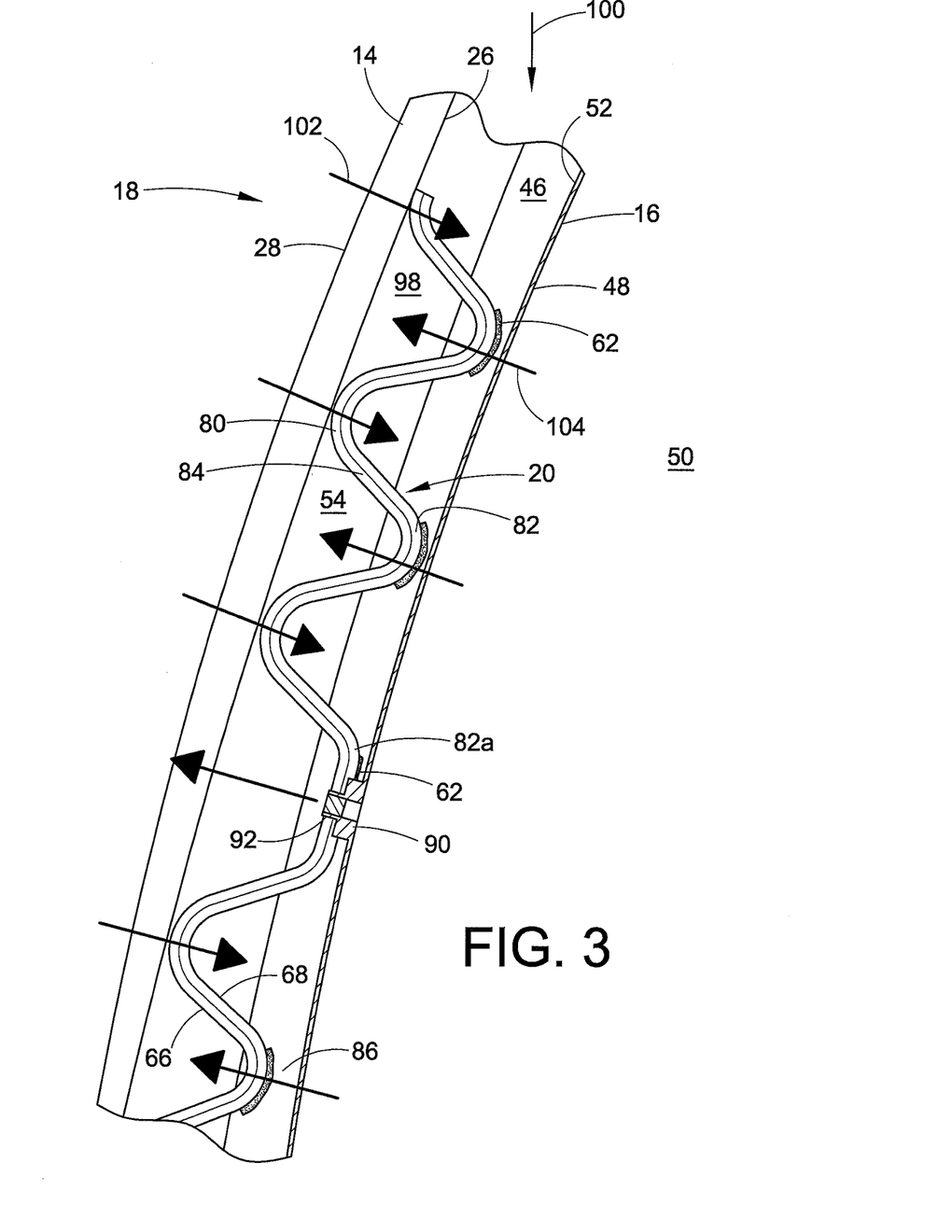
FIG. 3 is a cross-sectional view of the vehicle pillar similar to FIG. 2 including a structural adhesive and prior to heating or baking the vehicle body structure.

With continued reference to FIG. 2, the vehicle body structure 10 also includes a plate nut 90, or similar mechanical fastener, affixed to the inner panel 16. The plate nut 90 can be welded to the inner panel 16. As more clearly seen in FIG. 1, the reinforcement structure 20 includes an opening 92. With reference back to FIG. 2, the opening 92 receives the plate nut 90, or similar mechanical fastener. The opening 92 is formed in one of the valley sections 82a, which is the flattened valley section. As seen in FIG. 3, the structural adhesive 62 can be applied to the second surface 68 of the reinforcement structure 20 at the one valley section 82a adjacent the opening 92. The plate nut 90 can operate as a locator device when attaching the inner panel 16 to the outer panel 14.

The structural adhesive 62 expands when heated above a predetermined temperature threshold. In a typical vehicle manufacturing process, the vehicle body is heated, also referred to as baked, after painting the vehicle. The temperature at which the vehicle body is baked after painting is high enough and above the predetermined temperature threshold at which the structural adhesive 62 expands. An example of such a predetermined temperature threshold is about 150 degrees C. However, it will be appreciated that other temperatures may be used depending upon the type of materials and structural adhesives employed. It will also be understood that any suitable structural adhesive known to those skilled in the art may be used.

As seen when comparing FIG. 3, which depicts the vehicle body structure prior to baking, and FIG. 4, which depicts the vehicle body structure after baking, the structural adhesive 62 expands and contacts the second surface 68 of the reinforcement structure 20 and the inner panel 16 after being heated above the predetermined temperature threshold. Additionally, the structural adhesive 62 expands to span each gap 86 between each valley section 82 of the reinforcement structure 20 and the inner panel 16 after being heated above the predetermined temperature threshold.

As more clearly seen in FIG. 4, respective corrugation volumes 96 are defined between adjacent valley sections 82, a respective peak section 80 between the adjacent valley sections, the respective connecting sections 84 spanning between the respective peak section and the adjacent valley sections and the inner panel 16. In the illustrated embodiment, each of these respective corrugation volumes 96 is devoid of material other than air. Similarly, respective corrugation volumes 98, which are defined between adjacent peak sections 80, a respective valley section 82 between the adjacent peak sections, the respective connecting sections 84 spanning between the respective valley section and the adjacent peak sections and the outer panel 14, are also devoid of material other than air.

To review, the vehicle body structure 10 includes the vehicle roof member 12 and the outer panel 14 connected with and depending vertically downwardly from the vehicle roof member. The vehicle body structure 10 also includes the inner panel 16 connected with the outer panel 14. The outer panel 14 and the inner panel 16, when connected, form the vehicle pillar 18, which depends downwardly from the roof member 12. The vehicle body structure 10 also includes the serpentine-shaped reinforcement structure 20, which includes a plurality of peak sections 80 and a plurality of valley sections 82. The serpentine-shaped reinforcement structure 20 is disposed in the vehicle pillar 18 between the inner panel 16 and the outer panel 14. The vehicle body structure 10 also includes a plurality of welds 60, which are schematically depicted in FIG. 1. Each weld 60 affixes the reinforcement structure 20 to the outer panel 14 at each peak section 80. The vehicle body structure 20 can also include the structural adhesive 62 applied on the second surface 68 at each valley section 82. The structural adhesive 62 affixes the reinforcement structure 20 to the inner panel 16. The structural adhesive 62 can expand when heated above the predetermined temperature threshold.

During a rollover event, or another event where a sizable load is being transmitted from the roof of the vehicle, a vertical load, as shown depicted by arrow 100 in FIG. 2, is applied on the vehicle pillar 18. Due to the curvature of the vehicle pillar 18, the outer panel 14 stretches in tension while the inner panel 16 presses toward the outer panel in compression. This collapses the outer panel 14 onto the reinforcement structure 20 (depicted by arrows 102) and the inner panel 16 onto the reinforcement structure 20 (depicted by arrows 104), which slows the movement of both panels during the remainder of the event. The outer panel 14 of the vehicle pillar 18 is configured such that a generally vertical load applied to the vehicle roof member 12 great enough to deform the outer panel stretches the outer panel in tension. The inner panel 16 of the vehicle pillar 18 is configured such that the generally vertical load applied to the vehicle roof member 12 deforms the inner panel in compression pressing the inner panel toward the outer panel 14. The reinforcement structure 20 is positioned with respect to the inner panel 16 such that the reinforcement structure inhibits further movement of the inner panel toward the outer panel while the generally vertical load is applied to the vehicle roof member. Friction between the reinforcement structure 20 and the inner panel 16 can also counteract the forces on the inner panel 16 and the outer panel 14 to inhibit further deformation of the vehicle pillar 18 during a roll over event to maintain the section of the vehicle pillar (for example, when no structural adhesive is being used to affix the reinforcement structure 20 to the inner panel 16).

A method for manufacturing a vehicle body structure, such as the vehicle body structure 10 depicted in FIGS. 1-4, will be described with reference to FIG. 5. The method depicted in FIG. 5 will refer back to FIGS. 1-4; however, the method depicted in FIG. 5 could be utilized with vehicle body structures taking alternative configurations. The method for manufacturing vehicle body structure 10 (FIG. 1.) includes, at 110, positioning the reinforcement structure 20 in contact with the outer (first) panel 14 of the vehicle pillar 18. The method further includes, at 112, welding the reinforcement structure 20 to the outer panel 14. The method further includes, at 114, applying the structural adhesive 62 to the reinforcement structure 20. The method further includes, at 116, connecting the inner (second) panel 16 to the outer panel 14. The method further includes, at 118, baking or heating the vehicle body structure 10 to expand the structural adhesive 62.

Positioning the reinforcement structure 20 in contact with the outer panel 16 of the vehicle pillar 18, at 110, can further include positioning the first surface 66 of the reinforcement structure 20 in contact with the inner surface 26 of the outer panel 14. As mentioned above, the reinforcement section 20 includes a plurality of peak sections 80 and a plurality of valley sections 82. Positioning the first surface 66 of the reinforcement structure 20 in contact with the outer panel 14 of the vehicle pillar 18, at 110, can also include positioning the first surface 66 of the reinforcement structure 20 at each peak section 80 in contact with the outer panel.

Applying the structural adhesive 62 to the reinforcement structure 20, at 114, can further include applying the structural adhesive 62 to the second surface 68 of the reinforcement structure 20, where the second surface is on an opposite side of the reinforcement structure as the first surface 66. Moreover, applying the structural adhesive to the reinforcement structure, at 114, can further include applying the structural adhesive 62 to the second surface 68 at each valley section 82 of the reinforcement section 20.

Connecting the inner panel 16 to the outer panel 14, at 116, can further include connecting the inner panel 16 to the outer panel 14 in a manner that the reinforcement structure 20 is interposed between the outer panel 14 and the inner panel 16 and the second surface 68 of the reinforcement structure 20 faces toward the inner panel 16. Connecting the inner panel 16 to the outer panel 14 can further include connecting the inner panel 16 to the outer panel 14 in a manner to provide the gap 86 between the second surface 68 of the reinforcement structure 20 and the outward-facing surface 52 of the inner panel 16. Connecting the inner panel 16 to the outer panel 14 can further include connecting the inner panel 16 to the outer panel 14 in a manner such that the reinforcement structure 20 is optimally located to encourage frictional contact between the reinforcement structure 20 and the inner panel 16 (for example, when no structural adhesive is being used) upon very slight deformation of the inner panel 16 or the outer panel 14 while a generally vertical load is being applied on the vehicle roof member 12. The friction between the reinforcement structure 20 and the inner panel 16 can prevent further deformation of the panels 14, 16 and help maintain the section of the vehicle pillar 18.

The method for manufacturing a body structure can also include inserting a mechanical fastener, such as the nut plate 90, through an opening 92 in the reinforcement structure 20, at 120. More specifically, connecting the inner panel 16 to the outer panel 14 can further include inserting the mechanical fastener, such as the nut plate 90, through the opening 92 in the reinforcement structure 20.

Baking or heating the vehicle body structure, at 118, can further include heating the vehicle body structure 10 to expand the structural adhesive 62 such that the adhesive contacts the inner panel 16. Moreover, baking or heating the vehicle body structure, at 118, can further include heating the vehicle body structure to expand the structural adhesive 62 such that the adhesive contacts the inner panel 16 leaving a plurality of corrugation volumes 96, which are devoid of structural adhesive, between adjacent valley sections 82.

Described above is a vehicle body structure having a vehicle pillar that can withstand greater loads on the roof of the vehicle as compared to a pillar not having such a reinforcement structure. Even though the figures depict the reinforcement structure 20 welded to the outer panel 14 and fixed to the inner panel 16 via structural adhesive, it is contemplated that the reinforcement structure could connect with the outer panel 14 via a structural adhesive and the inner panel 16 via a welding operation. As seen in FIG. 1, the vehicle pillar 18 is disposed between the forward window opening 38 and the rearward window opening 40. As such, a welder W can insert an arm A through one of the window openings 38 or 40 to attach the reinforcement structure 20 to the outer panel 14. Once the inner panel 16 is connected to the outer panel 14, attaching the reinforcement structure to the inner panel 16 is no longer easily possible by a welding operation. As such, the structural adhesive 62 can be applied to the reinforcement structure 20 to attach the reinforcement structure to the inner panel 16. This fixes the reinforcement structure 20 to the inner panel 16, which allows the inner panel to press onto the reinforcement structure during a rollover event. This connection also inhibits movement of the reinforcement structure 20 with respect to the inner panel 16 in a vertical direction. If no structural adhesive is being used to affix the reinforcement structure 20 to the inner panel 16, friction between the reinforcement structure 20 and the inner panel 16 can also counteract the forces on the inner panel 16 and the outer panel 14 to inhibit further deformation of the vehicle pillar 18 during a roll over event to maintain the section of the vehicle pillar.

A vehicle body structure and a method for manufacturing such a vehicle body structure has been described above in particularity. Modifications and alterations will occur to those upon reading and understanding the preceding detailed description. The invention, however, is not limited to only the embodiments described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle body structure comprising:
 a vehicle roof member;
 a first panel connected with and depending downwardly from the vehicle roof member;
 a second panel connected with the first panel, wherein the first panel and the second panel form, when connected, a vehicle pillar; and
 a serpentine-shaped reinforcement structure including a plurality of peak sections and a plurality of valley sections disposed in the vehicle pillar between the first panel and the second panel, wherein the reinforcement structure is fixed to the first panel via a weld at a peak section and the reinforcement structure is closest to the second panel at a valley section, wherein the reinforcement structure includes a first surface contacting the first panel and a second surface, which is opposite the first surface, facing and spaced from the second panel, wherein the first surface of the reinforcement structure contacts the first panel at each peak section and the second surface of the reinforcement structure at each valley section defines a gap between each valley section of the reinforcement structure and the second panel and wherein the reinforcement section is welded to the first panel at each of the peak sections and the reinforcement section is fixed to the second panel via the structural adhesive at each of the valley sections.

2. The structure of claim 1, wherein the reinforcement structure is fixed to the second panel via structural adhesive.

3. The structure of claim 2, wherein the structural adhesive expands when heated above a predetermined temperature threshold.

4. The structure of claim 3, wherein the structural adhesive expands and contacts the second surface of the reinforcement structure and the second panel after being heated above the predetermined temperature threshold.

5. The structure of claim 4, wherein the structural adhesive is applied to the second surface at each valley section.

6. The structure of claim 5, wherein the structural adhesive expands to span each gap between each valley section of the reinforcement structure and the second panel after being heated above the predetermined temperature threshold.

7. The structure of claim 6, wherein the reinforcement section includes a plurality of connecting sections, wherein each connecting section spans between a respective peak section and an adjacent valley section, wherein respective corrugation volumes defined between adjacent valley sections, a respective peak section between the adjacent valley sections, the respective connecting sections spanning between the respective peak section and the adjacent valley sections and the second panel is substantially devoid of material other than air.

8. The structure of claim 1, wherein the reinforcement section is a corrugated metal sheet having a substantially constant thickness throughout the sheet measured between a first surface and a second, opposite, surface, and the reinforcement section includes at least three peak sections and at least three valley sections.

9. The structure of claim 1, further comprising a plate nut affixed to the second panel, wherein the reinforcement structure includes an opening that receives the plate nut, wherein the opening is formed in one of the valley sections.

10. The structure of claim 1, wherein the first panel is an outer panel and the second panel is an inner panel, wherein the outer panel of the vehicle pillar is configured such that a generally vertical load applied to the vehicle roof member great enough to deform the outer panel stretches the outer panel in tension, wherein the inner panel of the vehicle pillar is configured such that the generally vertical load applied to the vehicle roof member deforms the inner panel in compression pressing the inner panel toward the outer panel, and wherein the reinforcement structure is positioned with respect to the inner panel such that the reinforcement structure inhibits further movement of the inner panel toward the outer panel while the generally vertical load is applied to the vehicle roof member by way of friction between the reinforcement structure and the inner panel.

11. A method for manufacturing a vehicle body structure, the method comprising:
positioning a first surface of a serpentine-shaped reinforcement structure at a peak section of the serpentine-shaped reinforcement structure in contact with a first panel of a vehicle pillar that is connected with a vehicle roof member, wherein the reinforcement structure includes a plurality of peak sections and a plurality of valley sections;
welding the reinforcement structure to the first panel; and
connecting a second panel to the first panel in a manner that the reinforcement structure is interposed between the first panel and the second panel and a second surface of the reinforcement structure faces toward the second panel, wherein the second surface is on an opposite side of the reinforcement structure as the first surface and a gap is provided between the second surface of the reinforcement structure and the second panel.

12. The method of claim 11, further comprising applying a structural adhesive to the second surface of the reinforcement structure.

13. The method of claim 12, further comprising heating the vehicle body structure to expand the structural adhesive such that the adhesive contacts the second panel.

14. The method of claim 12, wherein applying the structural adhesive to the second surface of the reinforcement structure includes applying the structural adhesive to the second surface at each valley section of the reinforcement structure.

15. The method of claim 11, further comprising inserting a mechanical fastener through an opening in the reinforcement structure.

16. The method of claim 15, wherein connecting the second panel to the first panel further includes inserting the mechanical fastener through the opening in the reinforcement structure.

17. A vehicle body structure comprising:
a vehicle roof member;
an outer panel connected with and depending downwardly from the vehicle roof member, the outer panel including an inner surface and an outer surface;
an inner panel connected with the outer panel, wherein the outer panel and the inner panel, when connected, form a vehicle pillar depending downwardly from the roof member, wherein the inner panel includes an inward-facing surface and an outward-facing surface;
a serpentine-shaped reinforcement structure including a plurality of peak sections and a plurality of valley sections disposed in the vehicle pillar between the inner panel and the outer panel, the reinforcement structure including a first surface contacting the inner surface of the outer panel and a second surface, which is opposite the first surface, facing towards the outward-facing surface of the inner panel;
a plurality of welds, each weld affixing the reinforcement structure to the outer panel at each peak section, and
structural adhesive applied on the second surface at each valley section affixing the reinforcement structure to the inner panel;
wherein the outer panel of the vehicle pillar is configured such that a generally vertical load applied to the vehicle roof member great enough to deform the outer panel stretches the outer panel in tension,
wherein the inner panel of the vehicle pillar is configured such that the generally vertical load applied to the vehicle roof member deforms the inner panel in compression pressing the inner panel toward the outer panel, and
wherein the reinforcement structure is positioned with respect to the inner panel such that the reinforcement structure inhibits further movement of the inner panel toward the outer panel while the generally vertical load is applied to the vehicle roof member.

18. The structure of claim 17, wherein the structural adhesive expands when heated above a predetermined temperature threshold.

19. The method of claim 11, wherein welding the reinforcement structure to the first panel further includes welding each peak section of the reinforcement structure to the first panel.

* * * * *